Oct. 3, 1967 G. HAAS 3,345,621
PULSE SEQUENCE PRODUCER WITH INTERFERENCE SIGNAL SUPPRESSION
Filed July 12, 1963
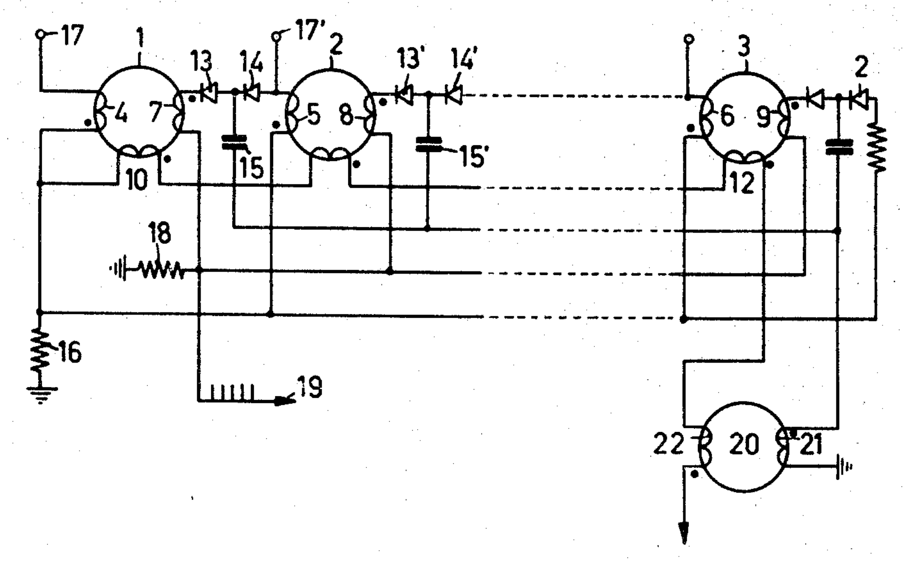
INVENTOR.
GERHARD HAAS
BY
AGENT

United States Patent Office 3,345,621
Patented Oct. 3, 1967

3,345,621

PULSE SEQUENCE PRODUCER WITH INTERFERENCE SIGNAL SUPPRESSION

Gerhard Haas, Hamburg, Germany, assignor to North American Philips Company, Inc., New York, N.Y., a corporation of Delaware Filed July 12, 1963, Ser. No. 294,478
Claims priority, application Germany, July 13, 1962
P 29,811
4 Claims. (Cl. 340—174)

ABSTRACT OF THE DISCLOSURE

A pulse sequence shift register counter having a series of annular magnetic cores, serially connected by a diode pair, and having their output windings connected to a common impedance. A capacitor is provided for each core, charging upon a shift pulse initiated change of state in a prior core, and discharging to change the state of a successive core after the termination of the shift pulse.

The invention relates generally to pulse sequence producers and more particularly to pulse sequence producers which provide a predetermined number of pulses by external pulse excitation.

Pulse sequence producers are involved in such digital electronic areas as (control-techniques, adjusting techniques, computer techniques). For example with electronic computers carrying out arithmetical operations by pulse counting, each written digit requires the production of corresponding numbers of pulses. If in a key operated device, the key 7 is actuated, seven pulses must be produced. In this case the arrangement acts as a converter for the conversion of a "1-out-of-10" code digit (usually a "1-out-of-B digit") into the corresponding number of pulses.

Pulse sequencing can be accomplished by means of any counter. Since an electronic counter in a B-base digital system comprised of active bi- or quadripoles (for instance vacuum tubes, glowlight discharge tubes, transistors or magnet cores), supplies a pulse solely at the transition from B–1 to 0 (carry), further technical measures must be taken for the production of the desired number of pulses; for instance a bistable multivibrator, an and-gate and delay elements or some combination thereof, may be needed.

The invention relates to a pulse sequence producer which solves the problem concerned using only conventional counter and the carry pulse and wherein the output windings of the annular cores comprising the counters are commonly connected to an impedance from which the pulse sequence can be derived.

The arrangement comprises a multistage counter which supplies an output pulse, during each step performed by means of a shift pulse, from any stage $n$ to $n+1$ and which is formed by a diode-coupled annular-core shift register including intermediate-storage capacitors. The desired pulse sequence may be derived by closing a mechanical contact or an electronic switch. The known counting arrangements provide a pulse only at a step performed from the stage B–1 to the stage 0 (said pulse being a "carry").

The figure of the drawing shows a shift register employing one embodiment of the invention. Referring to the figure, the annular cores 1, 2, 3 form a shift register and are composed of magnetic material having a rectangular hysteresis loop. Each core is provided with an input winding 4, 5, 6, an output winding 7, 8, 9, and a winding 10, 11, 12 for the shift pulse. The output winding, for instance 7, is coupled with the input winding 5 of the next-following core via diodes 13, 14 and the output winding 8 is coupled via diodes 13', 14' and so on. With the junction of the two diodes is coupled an intermediate-storage capacitor 15, 15', etc. The conductor of the shift windings 10, 11, 12 is terminated by a resistor 16.

Each input winding 4, 5, 6 has an input terminal 17, 17', and so on and the output windings 7, 8, 9 are connected at one end in common to a resistor 18 or an impedance.

As compared with known registers the arrangement described above permits, by means of the resistor 16 and the diode 14, separation between the charge and the discharge of the capacitors 15, 15' for intermediate storage. As compared with the general structure of a shift register, the present invention provides only one core each time in the 1-position. For example, if the first core 1 is in a state of positive remanence, whereas all further cores are in the state of negative remanence, a negative shift pulse of suitable intensity and duration across the winding 10 will shift the core 1 into a state of negative remanence. The voltage thus induced into the output winding 7 provides capacitor 15 with a negative charge. A discharge via the input winding 5 of the next-following core 2 is prevented by the diode 14, since the latter is negatively biased for the duration of the shift pulse by the voltage drop across the resistor 16. After the termination of the shift pulse the charge of the capacitor 15 can flow via the diode 14 through the winding 5 and the core 2 is shifted to the state of positive remanence. Thus the position of the counter has shifted by one step to the right. If the core 1 is followed by $n$–1 cores, a carry pulse is supplied at the output winding 9 of the last core after a total of $n$ shift pulses. The shift pulses may be continuously operative, if care is taken that the writing pulses at the terminals 17, 17', and so on have adequate intensity.

The invention is based on the recognition of the fact that with each successive step of the state of positive remanence in the next-following core, at the common cold end of the output windings 7, 8, 9 there will flow a current for charging the capacitors 15, 15', etc. By including a resistor 18 a pulse sequence can thus be derived from point 19, which sequence has a number of pulses $m$ determined by the preceding writing in the complementary core $n$–$m$ (by excitation or control of the corresponding terminal 17). With a decimal system for example the production of the digits 0–9 requires the use of 9-step counter.

The value of the resistor 18 must be chosen so small that the charge of the capacitors 15, 15', etc., is not disturbed, whereas said value must, on the other hand, be so high that the output pulses have an adequate amplitude. It is particularly advantageous to include, instead of an ohmic resistor, a pulse transmitting member having a suitably chosen transmission ratio.

Apart from the effective pulse of the changed-over core the $n$–1 non-actuated cores may give rise to interference pulses with each shift pulse in the resistor of the transmitting member 18 owing to a hysteresis loop deviating from the ideal rectangular shape. With a Zener pulse producer 8 interference pulses for one shift pulse might become operative simultaneously, which might suggest an output pulse, even if no core has been written. The suppression of these reversible interference signals may be obtained by the additional core 20. The latter is constantly in the state of negative remanence and is also traversed by the shift pulses via the winding 21. The sense and number of the windings of its output 22 are chosen so that the reversible output voltage occurring at each shift pulse biases the capacitors 15, 15', etc., to an extent such that the output voltages produced across the output windings of the non-actuated cores are compensated for.

What is claimed is:

1. A pulse sequence producer comprising a plurality of storage elements having first and second stable states, all of said storage elements having a common shift winding, means applying a shift pulse to said common shift winding, said pulse being operative to place each of said elements in said first stable state, coupling means serially interconnecting adjacent storage elements to form a row of storage elements, said coupling means including chargeable means for storing an intermediate signal when a storage element adjacent said coupling means is placed in said first stable state by said shift pulse, means responsive to the absence of said shift pulse for causing said chargeable means to discharge said intermediate signal thereby to change the state of the next successive and adjacent storage element to said second stable state, output means commonly connected to each of said storage elements for providing a signal indicative of the charging of said chargeable means, and means for preventing interference pulses from non-actuated elements, said last named means comprising, a further bistable storage element having a first winding connected between said chargeable means and a grounding point, and a second winding connected between said means applying a shift pulse and said common shift winding, said first and second windings poled in magnetic opposition with respect to each other.

2. The combination of claim 1 further including means for applying an excitation signal to any of said storage elements for selectively varying the pulse sequence signal appearing across said output means.

3. A pulse sequence producer comprising a plurality of storage elements having first and second stable states and arranged in a row, each element having an input winding, an output winding, and a shift winding common to all of said elements in said row, first and second like poled diodes joined at a common point and serially interconnected between a first respective terminal of each of said output and input windings of successive storage elements, capacitive means connected between the common point of each pair of like poled diodes and a further common point, first impedance means commonly terminating a second terminal of each of said output windings, second impedance means commonly terminating a second terminal of each of said input terminals, said second impedance means being coupled to said common shift winding, means applying a shift pulse to said common shift windings for placing each of said storage elements in said first state, each said first diode responsive to a change of state manifested in the output winding of its associated storage element to pass a charge to the capacitive means connected thereto, each said second diode responsive to the presence of said shift pulse across said second impedance means to prevent said capacitive means from discharging through said diode into the input winding of the next successive storage element connected thereto, said second diode further responsive to the absence of said shift pulse across said second impedance means to permit said capacitive means to discharge through said second diode into the input of said next successive storage element, means for applying an excitation signal to any of said storage elements for selectively blocking a state change therein to thereby vary the output pulse sequence, means for deriving said output pulse sequence from said first impedance means in accordance with the charging of said capacitive means, and means for preventing interference pulses from non-actuated elements, said last named means comprising, a further bistable storage element having a first winding connected between said further point and a grounding point, and a second winding connected between said means applying a shift pulse and said common shift winding, said first and second windings poled in magnetic opposition with respect to each other.

4. The combination of claim 3 wherein said first impedance means is constituted by a pulse transmission member having a predetermined transmission ratio.

References Cited

UNITED STATES PATENTS

| | | | |
|---|---|---|---|
| 3,030,611 | 4/1962 | Pike | 340—174 |
| 3,059,227 | 10/1962 | Woo | 340—174 |

BERNARD KONICK, *Primary Examiner.*

JAMES W. MOFFITT, *Examiner.*

R. MORGANSTERN, *Assistant Examiner.*